United States Patent [19]

Gillespie et al.

[11] 4,308,776

[45] Jan. 5, 1982

[54] WEB SECTIONING APPARATUS WITH ADJUSTABLE KNIFE ENGAGEMENT

[75] Inventors: Andrew J. Gillespie, Richmond; George Dingus, Cartersville, both of Va.

[73] Assignee: Philip Morris Incorporated, New York, N.Y.

[21] Appl. No.: 143,812

[22] Filed: Apr. 23, 1980

[51] Int. Cl.[3] .............................................. B23D 25/02

[52] U.S. Cl. .......................................... 83/344; 83/346

[58] Field of Search ........................ 83/344, 346, 347; 100/168; 72/452

[56] References Cited

U.S. PATENT DOCUMENTS

| | | | |
|---|---|---|---|
| 2,711,935 | 6/1955 | Miles | 83/344 X |
| 3,276,306 | 10/1966 | Winkler et al. | 83/344 X |
| 3,289,513 | 12/1966 | Johnson et al. | 83/344 |
| 3,720,126 | 3/1973 | Kranz | 83/344 |
| 4,130,042 | 12/1978 | Reed | 83/344 X |

*Primary Examiner*—James M. Meister
*Attorney, Agent, or Firm*—Robert M. Shaw

[57] ABSTRACT

The housing of web sectioning apparatus having a rotary knife assembly and a rotary cutting drum is provided with a pair of bearing surfaces. A frame is pivotally mounted on these bearing surfaces, and the rotary knife assembly is rotatably mounted to the frame eccentrically of the pivot axis between the frame and the housing. Thus, by pivoting the frame relative to the housing, the axis of rotation of the rotary knife assembly can be moved towards or away from the cutting drum to adjust the degree of engagement between the edges of the knife assembly and the cutting drum. Clamps are provided to force the frame against the bearing surfaces of the apparatus to prevent movement at the pivot axis between the frame and housing during operation. These clamps are released to allow adjustment. The frame can be pivoted in small increments to finely adjust the position of the knife assembly rotation axis relative to the cutting drum.

15 Claims, 5 Drawing Figures

WEB SECTIONING APPARATUS WITH ADJUSTABLE KNIFE ENGAGEMENT

BACKGROUND OF THE INVENTION

The present invention relates to apparatus for sectioning a continuous web of material. Web sectioning apparatus is described in U.S. patent application Nos. 941,497 filed Sept. 11, 1978 and 967,782 filed Dec. 8, 1978, both of which are assigned to the same assignee as the assignee of the present application and both of which are hereby incorporated by reference herein in their entirety. The apparatus described in such prior copending applications includes a drum and a rotary knife assembly which are mounted on parallel axes. The web to be sectioned is carried on the drum. The drum and the knife assembly are rotated so that the cutting edges of the knife assembly, which extend parallel to the axis of the knife assembly, will repetitively engage the drum and cut the web along lines transverse to its direction of elongation. Such apparatus is frequently used for sectioning cigarette tipping paper.

As will be readily appreciated, each of the cutting edges of the knife assembly must precisely engage the surface of the drum. If the cutting edges engage the drum surface too forcefully, they will rapidly become dull; if the cutting edges do not touch the drum surface they will not cut the web cleanly. The knife assembly described in said copending application Ser. No. 967,782 provides means for precisely adjusting the position of each cutting edge relative to the axis of rotation of the knife assembly.

However, prior to the present invention there has been a long felt need for web sectioning apparatus which is so constructed that the axis of rotation of the knife assembly may be precisely and repeatedly adjusted towards or away from the drum to control the degree of engagement of the cutting edges with the drum surface, but in which the axis of rotation of the knife assembly will be securely maintained in position after adjustment during operation of the apparatus.

BRIEF DESCRIPTION OF THE INVENTION

It is an object of the present invention to provide such a web sectioning apparatus.

The apparatus of the present invention includes a housing and a drum rotatably mounted to the housing. The housing has a pair of coaxial concave bearing surfaces. The common axis of such bearing surfaces is parallel to the axis of the drum. A frame having a pair of coaxial journals is provided. Each journal of the frame is received in an associated one of the aforementioned bearing surfaces. A knife assembly is rotatably mounted to the frame between the journals on an axis of rotation which is parallel to the axis of the journals but which is eccentric therefrom. The knife assembly has at least one cutting edge which extends parallel to such axis of rotation. Thus, a web carried by the drum can be sectioned by rotating the drum and the knife assembly to repetitively engage the cutting edge with the drum. Clamp means are provided for selectively forcing each of the journals of the frame against the associated bearing surface to fix the frame to the housing. The clamp means can also be operated to release the journals from such engagement. Movement means are provided for controllably pivoting the frame on the bearing surfaces when the journals are so released.

Thus, the degree of engagement between the cutting edge of the knife assembly and the surface of the drum may be adjusted by releasing the clamp means and operating the movement means to pivot the frame on the bearing surfaces. Because the axis of rotation of the knife assembly is eccentric from the axis of the journals, such pivoting action will move the axis of rotation of the knife assembly towards or away from the drum surface as desired. After the desired adjustment has been accomplished, the clamp means are operated to again force the journals against the associated bearing surfaces. The clamp means will thus prevent any further pivoting of the frame relative to the housing during operation of the apparatus. Also, because each journal is forced against its associated bearing surface during operation of the apparatus, there can be no undesired linear movement or "slop" at the junctures of the bearing surfaces and the journals during operation. Thus, the clamp means, together with the bearing surfaces and journals, provide what is effectively a slop-free, selectively pivotable joint between the frame and the housing.

Other objects, features and advantages of the present invention will be more readily apparent from the following detailed description of the preferred embodiments when read in conjunction with the accompanying drawings, in which like reference numerals are used to denote like features in the various views.

DETAILED DESCRIPTION OF THE PREFERRED EMBODIMENTS

Figure 1:
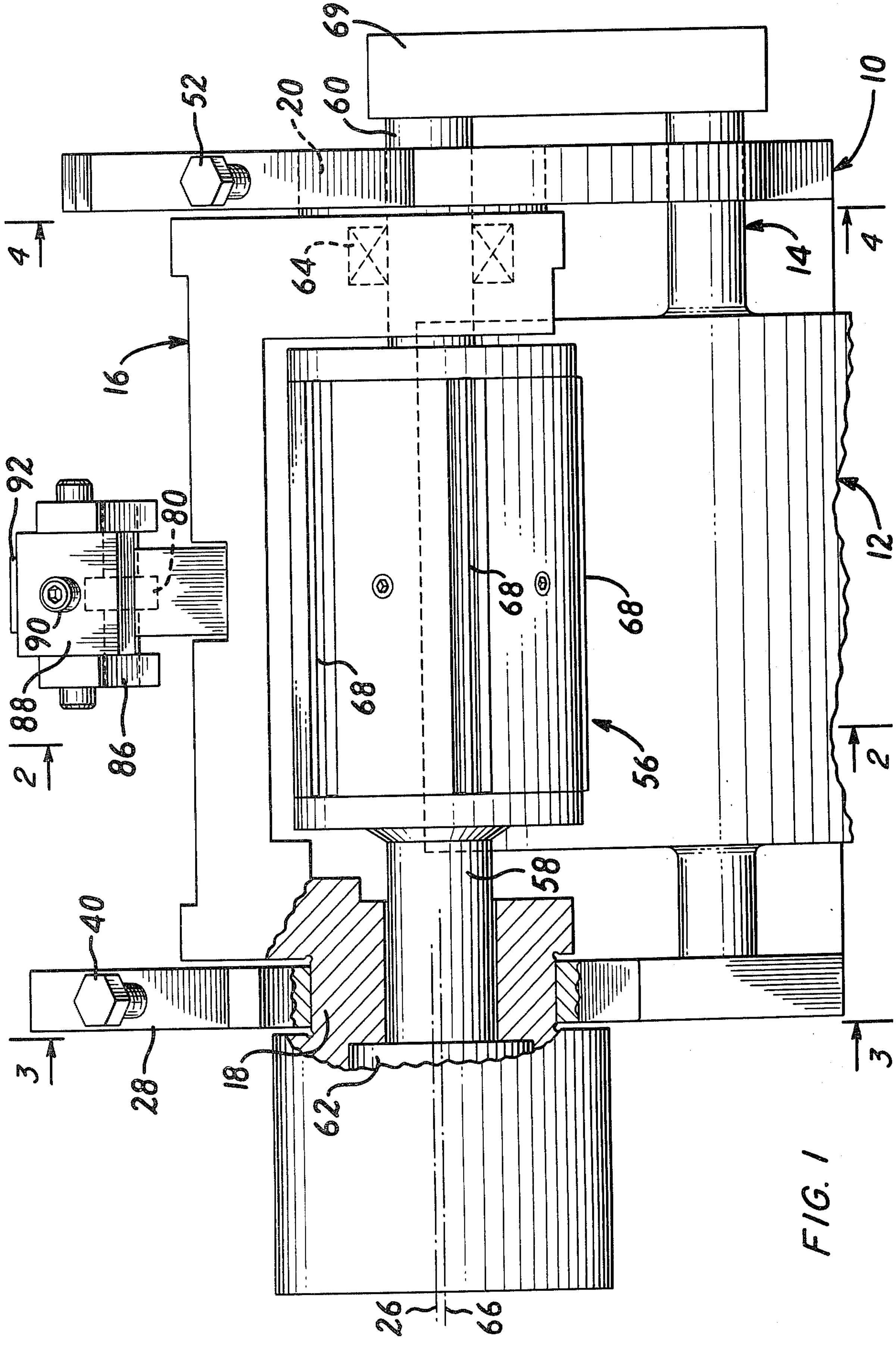
FIG. 1 is an end elerational view of an apparatus according to a first embodiment of the present invention.
Figure 2:
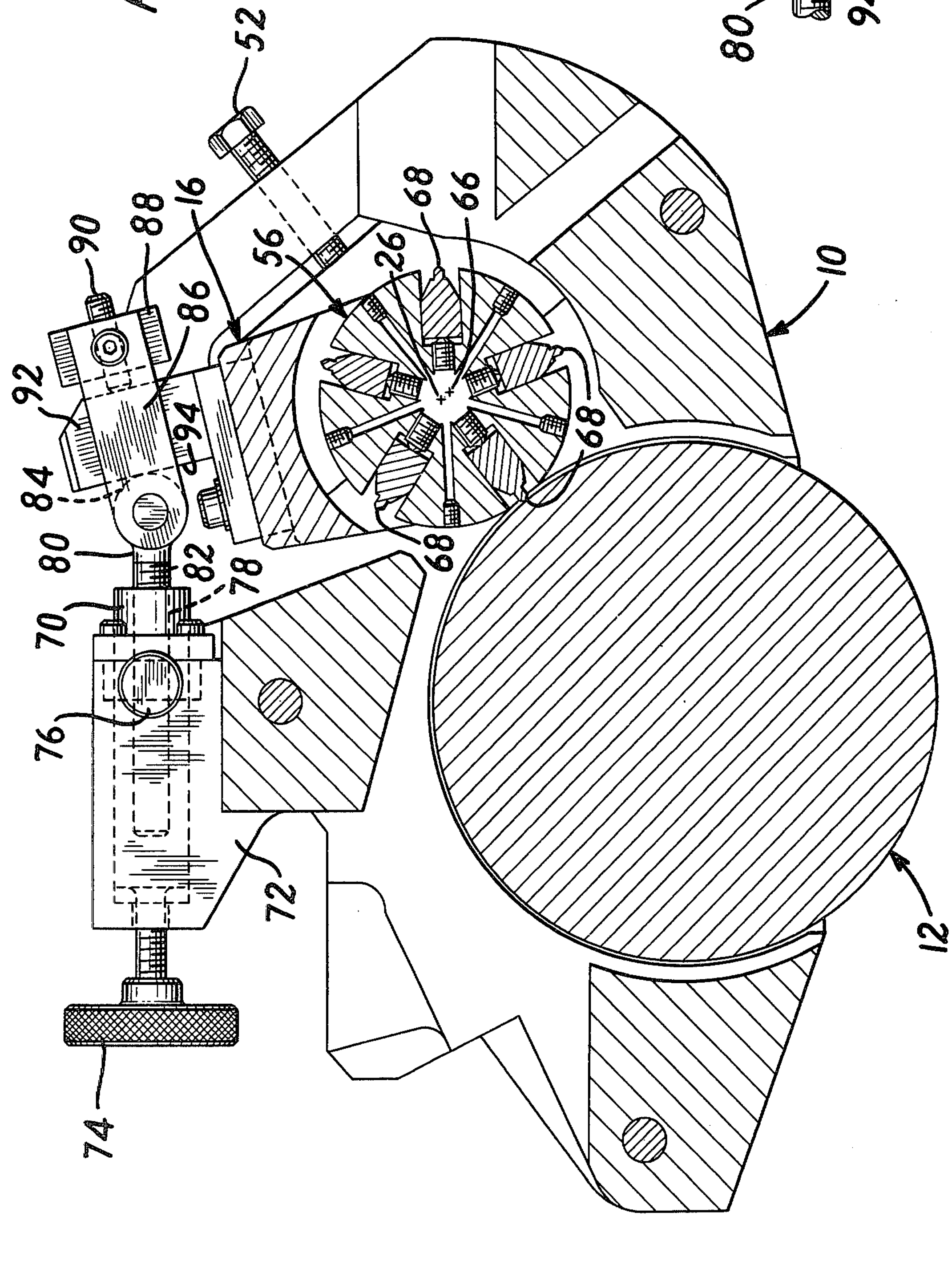
FIG. 2 is a sectional view taken on line 2—2 in FIG. 1.
Figure 4:
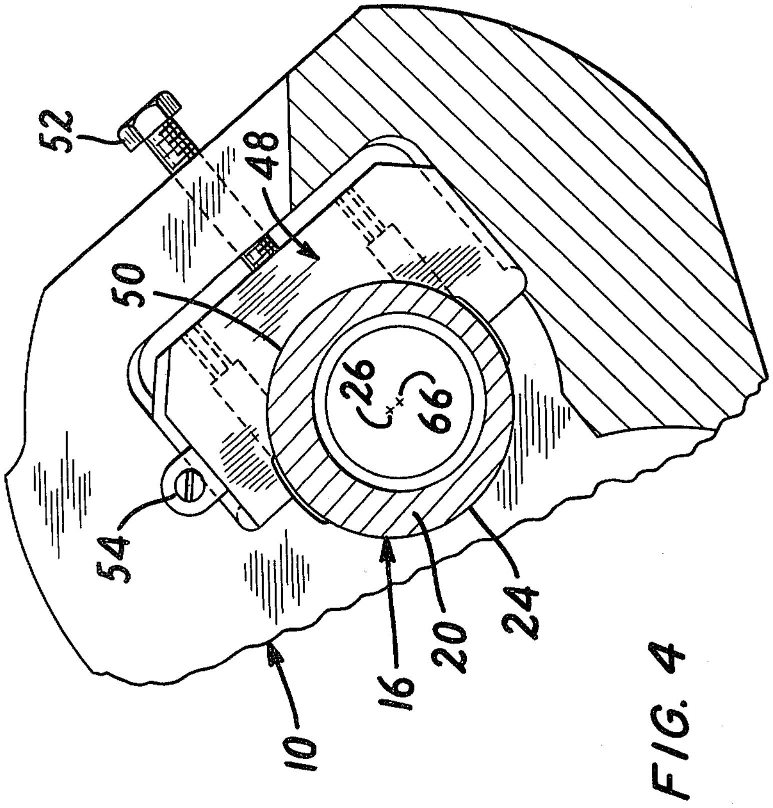
FIGS. 3 and 4 are fragmentary sectional views taken on lines 3—3 and 4—4 respectively in FIG. 1.
Figure 3:
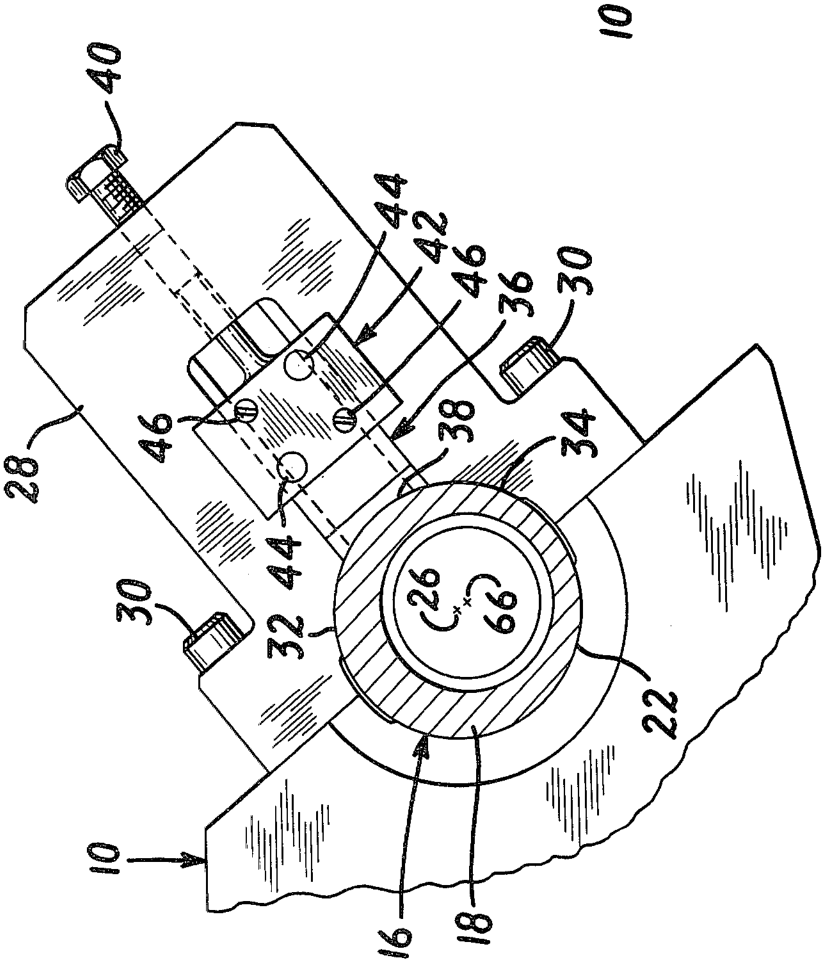

As shown in FIGS. 1 and 2, apparatus according to a first embodiment of the present invention includes a housing 10 and a cylindrical drum 12 rotatably mounted to the housing by means of a shaft 14 and bearings (not shown). A frame 16 is provided with a pair of cylindrical journals 18 and 20 (FIG. 1). As shown in FIG. 3, the housing 10 is provided with a first concave, semi-cylindrical bearing surface 22, and the first journal 18 of the frame is received in the concavity of this surface. As shown in FIG. 4, the frame is also provided with a second semi-cylindrical concave bearing surface 24, and the second journal 20 is received in the concavity of this surface. The bearing surfaces 22 and 24 are coaxial with one another, as are the journals 18 and 20 of the frame 16. Thus, the journals and the bearing surfaces serve to cooperatively mount the frame to the housing 10 for pivoting motion about an axis 26. The axis 26 is parallel to the axis of the drum 12.

As shown in FIG. 3, a clamp plate 28 is removably mounted to the housing 10 by a pair of screws 30. The plate 28 defines portions 32 and 34 of a further semi-cylindrical bearing surface. The surfaces 32, 34 and 22 provide a free running fit with the first journal 18 of the frame 16. A block 36 is slidably mounted to the clamp plate 28, and is thus slidably mounted to the housing 10.

The lower end of the block 36 overlies the journal 18. A jack bolt 40 is threadedly engaged with the clamp plate 28; the lower end of the jack bolt 40 bears upon the upper end of the block 36. Thus, by tightening the jack bolt 40, the block 36 may be forced toward the bearing surface 22 of the housing and toward the drum (downwardly and to the left as seen in FIG. 3). A lock plate 42 is mounted to the block 36 by means of pins 44. Screws 46 extend through the lock plate 42 into the block 36. By tightening the screws 46, the lock plate can be pressed against the side wall of the clamp plate 28 to fix the position of the block 36 relative to the clamp plate 28 and thus relative to the housing 10 after the bolt 40 has been tightened.

As seen in FIG. 4, a second block 48 is slidably mounted to the housing adjacent to the second bearing surface 24. The second block 48 has a concave semicylindrical surface 50 which overlies the second journal 20. A second jack bolt 52 is threadedly engaged with the housing 10; by tightening this second jack bolt 52, the second block 48 may be forced toward the second bearing surface 24 and toward the drum (downwardly and to the left as seen in FIG. 4). A gib screw 54 is threadedly engaged with an extension of the block 48. By tightening the gib screw 54, the position of the block 48 relative to the housing 10 may be fixed.

The blocks 36 and 48 are arranged to force the journals toward the bearing surfaces on a line of action which extends through the axis of the bearing surfaces and the axis of the drum.

As seen in FIG. 1, a knife assembly 56 is mounted to the frame 16 between the journals 18 and 20 by means of stub shafts 58 and 60 and anti-friction bearings 62 and 64. Although the axis of rotation 66 of the knife assembly with respect to the frame 16 is parallel to the axis 26 of the journals 18 and 20, the axis 66 is eccentric with respect to the axis 26. The axis of rotation 66 of the knife assembly with respect to the frame 16 lies beneath the axis 26 of the journals and bearing surfaces. Thus, as best appreciated with reference to FIGS. 3 and 4, clockwise pivoting of the frame 16 on the bearing surfaces 22 and 24 (i.e., on the axis 26) will move the axis of rotation 66 of the knife assembly downwardly and to the left. As seen in FIG. 2, such motion of the axis 66 will bring it closer to the drum 12.

As seen in FIGS. 1 and 2, the knife assembly 56 is provided with a plurality of cutting edges 68 which extend parallel to the axis of rotation 66 of the knife assembly 56. During operation of the apparatus, the knife assembly 56 is rotated counterclockwise and the drum 12, carrying a web of material (not shown) is rotated clockwise by an appropriate drive means 69 (FIG. 1). Such rotation causes the cutting edges of the knife assembly to engage the surface of the drum and part the web. As will be readily appreciated with reference to FIG. 2, the closer the axis 66 is to the axis of the drum, the more heavily the cutting edges 68 will engage the surface of the drum. Preferably, the knife assembly is of the type described in the aforementioned U.S. patent application No. 967,782.

As seen in FIG. 2, a control element 70 is rotatably mounted to an upward extension 72 of the housing 10. A knob 74 is fixed to an extension of the control element 70 so that the control element may be manually rotated. A detent 76 is provided to prevent unintentional rotation of the control element 70. The control element 70 has internal helical threads 78 concentric with its axis of rotation. A link 80 having external helical threads 82 is threadedly engaged with the control element. The link 80 has a cylindrical cam surface 84 at its right hand end. A shackle 86 is pivotally mounted to the link on an axis concentric with the axis of cam surface 84. A shackle end plate 88 is fixed to the end of the shackle remote from the link. A set screw 90 is threadedly engaged with the shackle end plate 88.

An arm 92 extends upwardly from the frame 16 between the shackle end plate 88 and the cam surface 84 of the link. Thus, the set screw 90 serves to maintain the front surface 94 of the arm in contact with the cam surface 84 of the link. As will be appreciated with reference to FIGS. 1 and 2, the arm 92 extends transversely of the axis 26 of the bearing surfaces and journals. By rotating the control element 70, the link 80 (FIG. 2) may be controllably moved transversely of the arm 92.

The degree of engagement of the cutting edges 68 with the drum 12 may be adjusted in the following manner: first, the clamp screws 46 (FIG. 3) and the gib screw 54 (FIG. 4) are loosened, and the jack bolts 52 and 40 are backed off to disengage the blocks 48 and 36 from the journals 18 and 20. The surface 32 and 34 of the clamp plate 28 will retain the frame 16 in pivotable but close engagement with the first bearing surface 22 even when the block 36 is disengaged from the journal 18. Likewise, the second block 48 is preferably only slightly retracted from the journal 20 so that the journal 20 is also maintained in pivotable but close engagement with the second bearing surface 24.

The control element 70 is rotated by means of the knob 74 to move the link 80 to the right or to the left as seen in FIG. 2. Such movement of the link will cause the frame 16 to pivot about the axis 26 on the bearing surfaces 24 and 22. The pivoting motion of the frame 16 on the axis 26 will move the axis of rotation 66 of the knife assembly towards or away from the drum. Thus, if the link 80 is moved to the right as seen in FIG. 2, the frame 16 will pivot clockwise and the axis of rotation 66 will be moved closer to the drum so that the cutting edges 68 will be more heavily engaged with the drum surface when the apparatus is later operated. Of course, movement of the link 80 to the left will have the opposite effect.

After the frame 16 has been pivoted to achieve the desired adjustment, the jack bolts 40 and 52 are tightened to force the blocks 36 and 48 (FIGS. 3 and 4) towards the drum. The first block 36 will engage the first journal 18 and force it tightly against the first bearing surface 22. Likewise, the second block 48 (FIG. 4) will engage the second journal 20 and force it tightly against the second bearing surface 24. After the jack bolts have been tightened, the lock screws 46 and the gib screw 54 are tightened to hold the blocks 36 and 48 in position and thus maintain the tight engagement of the journals with the bearing surfaces.

As will be readily appreciated, the forceful engagement of the blocks with the journals and of the journals with the bearing surfaces prevents any pivotal or linear movement of the frame 16 with respect to the housing 10 during operation.

The eccentricity or distance between the axis of rotation 66 and the axis 26 as seen in the drawings has been greatly exaggerated in the drawings for purposes of illustration. In actual practice, this distance is preferably only about 0.060 inches. Thus, the axis of rotation of the knife assembly would be moved at most about 0.120 inches towards or away from the drum surface by a 180° pivoting motion of the frame 16 relative to the housing 10. Of course, the small pivoting motion produced by incremental motion of the link 80 will produce an even smaller motion of the axis of rotation. Preferably, the distance of the link from the axis 26, the pitch of the threads 82 and 78 on the link and the control element, and the eccentricity between the axes 26 and 66 are chosen so that one half revolution of the knob will correspond to about three ten thousandths of an inch movement of the axis of rotation 66.

Figure 5:
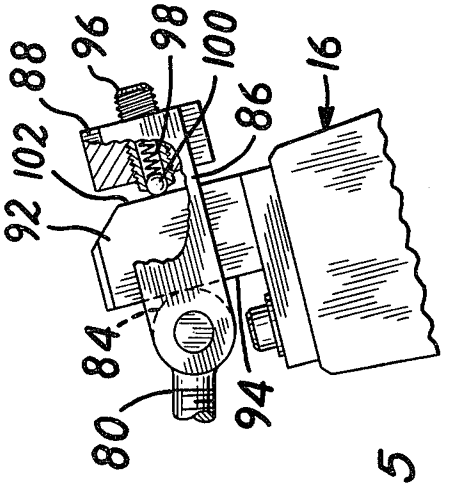
FIG. 5 is a fragmentary view depicting a portion of an apparatus according to a second embodiment of the present invention.

Apparatus according to an alternate embodiment of the present invention is partially depicted in FIG. 5. In this apparatus, the threaded housing of a ball plunger 96 is threadedly engaged with the shackle end 88. The ball plunger includes a compression spring 98 which bears on a ball 100. The ball 100 in turn bears on the rear surface 102 of the arm 92. Thus, the spring 98 will maintain the front surface 94 of the arm in contact with the cam surface 84 of the link 80 during adjustment of the apparatus. In other respects, the apparatus depicted in FIG. 5 is identical with the apparatus shown in FIGS. 1–4.

As numerous variations and combinations of the features set forth above can be utilized without departing from the spirit of the present invention, the foregoing description should be taken by way of illustration, rather than limitation, of the present invention as defined in the claims.

What is claimed is:

1. Web sectioning apparatus comprising:

(a) a housing having a pair of coaxial concave bearing surfaces;

(b) a drum rotatably mounted to said housing on an axis parallel to the axis of said bearing surfaces;

(c) a frame having a pair of coaxial journals, each of said journals being received in an associated one of said bearing surfaces so that the axis of said journals is concentric with the axis of said bearing surfaces, said frame being mounted for pivotal movement on said bearing surfaces about the axis of said journals;

(d) a knife assembly rotatably mounted to said frame on an axis of rotation fixed parallel to the axis of said journals but eccentric therefrom, said axis of rotation of the knife assembly being adjustable towards or away from the axis of the drum responsive to pivotal movement of the frame, said knife assembly having a cutting edge extending parallel to its axis of rotation, so that a web carried by said drum may be sectioned by rotating said drum and knife assembly to repetitively engage said cutting edge with said drum;

(e) clamp means for forcing each journal against the associated bearing surface to fix said frame to said housing so that the position of the axis of rotation of the knife assembly relative to the axis of the drum is securely maintained during operation of the apparatus, said clamp means also being operable to release said journals; and (f) movement means for controllably pivoting said frame on said bearing surfaces when said journals are released to adjust the degree of engagement between said cutting edge and said drum.

2. Apparatus as claimed in claim 1 wherein said clamp means is arranged to force each of said journals against the associated bearing surface in a direction towards said drum on a line of action extending through the axis of said bearing surfaces and the axis of said drum.

3. Apparatus as claimed in claim 1 wherein each of said bearing surfaces is semi-cylindrical.

4. Apparatus as claimed in claim 1 wherein said clamp means includes a pair of blocks slidably mounted to said housing, each one of said blocks overlying one of said journals, means for selectively forcing each of said blocks towards the associated one of said bearing surfaces and means for selectively fixing the position of each of said blocks relative to said housing.

5. Apparatus as claimed in claim 1 wherein said frame has an arm extending transversely of the axis of said journals and said movement means includes a link having an external cam surface mounted to said housing, means for controllably moving said link in a direction transverse to said arm, and means for maintaining contact between said arm and said cam surface.

6. Apparatus as claimed in claim 5 wherein said movement means includes a threaded control element rotatably mounted to said housing on an axis coincident with the axis of its threads and transverse to said arm, said link is threadedly engaged with said control element so that said link is mounted to said housing by means of said control element, and said movement means also includes means for rotating said control element.

7. Apparatus as claimed in claim 6 wherein said means for rotating said control element includes a manually rotatable knob and the proportions of the apparatus are selected so that one complete revolution of said knob corresponds to about 0.0003 inches movement of the axis of rotation of said knife assembly.

8. Apparatus as claimed in claim 5 wherein said means for maintaining includes a shackle pivotally connected to said link, a shackle end extending from said shackle so that said arm is between said shackle end and said cam surface and a set screw extending through said shackle end and engaged with said arm.

9. Apparatus as claimed in claim 8 wherein said cam surface is cylindrical, and said shackle is pivotally connected to said link on an axis concentric with the axis of said cam surface.

10. Apparatus as claimed in claim 5 wherein said means for maintaining includes a shackle pivotally connected to said link, a shackle end extending from said shackle so that said arm lies between said shackle end and said cam surface and a resilient element mounted to said shackle end and bearing on said arm.

11. Web sectioning apparatus comprising:

(a) a housing having a pair of coaxial concave bearing surfaces;

(b) a drum rotatably mounted to said housing on an axis parallel to the axis of said bearing surfaces;

(c) a frame having a pair of coaxial journals, each of said journals being received in an associated one of said bearing surfaces;

(d) a knife assembly rotatably mounted to said frame on an axis of rotation parallel to the axis of said journals but eccentric therefrom, said knife assembly having a cutting edge extending parallel to its axis of rotation, so that a web carried by said drum may be sectioned by rotating said drum and knife assembly to repetitively engage said cutting edge with said drum;

(e) clamp means for forcing each journal against the associated bearing surface to fix said frame to said housing, said clamp means including a pair of blocks slidably mounted to said housing, each one of said blocks overlying one of said journals, means for selectively forcing each of said blocks toward the associated one of said bearing surfaces and means for selectively fixing the position of each of said blocks relative to said housing, said clamp means also being operable to release said journals; and (f) movement means for controllably pivoting said frame on said bearing surfaces when said journals are released to adjust the degree of engagement between said cutting edge and said drum.

12. Apparatus as claimed in claim 11 wherein said frame has an arm extending transversely of the axis of said journals and said movement means includes a link having an external cam surface mounted to said housing, means for controllably moving said link in a direction transverse to said arm, and means for maintaining contact between said arm and said cam surface.

13. Apparatus as claimed in claim 12 wherein said means for maintaining contact between said arm and said cam surface includes a shackle pivotally connected to said link, a shackle end extending from said shackle so that said arm is between said shackle end and said cam surface, and a set screw extending through said shackle end and engaged with said arm.

14. Apparatus as claimed in claim 13 wherein said cam surface is cylindrical, and said shackle is pivotally connected to said link on an axis concentric with the axis of said cam surface.

15. Apparatus as claimed in claim 12 wherein said means for maintaining contact between said arm and said cam surface includes a shackle pivotally connected to said link, a shackle end extending from said shackle so that said arm lies between said shackle end and said cam surface, and a resilient element mounted to said shackle end and bearing on said arm.

* * * * *